United States Patent

[11] 3,625,591

| [72] | Inventors | Marvin J. Freiser<br>Scarborough;<br>Ivan Haller, Chappaqua, both of N.Y. |
|---|---|---|
| [21] | Appl. No. | 875,235 |
| [22] | Filed | Nov. 10, 1969 |
| [45] | Patented | Dec. 7, 1971 |
| [73] | Assignee | International Business Machines Corporation<br>Armonk, N.Y. |

[54] LIQUID CRYSTAL DISPLAY ELEMENT
4 Claims, 5 Drawing Figs.

[52] U.S. Cl. ........................................ 350/150,
350/160
[51] Int. Cl. ........................................ G02f 1/26
[50] Field of Search ........................................ 350/150,
160 LC; 313/91; 23/230 LC

[56] References Cited
UNITED STATES PATENTS
| 3,167,607 | 1/1965 | Marks et al. ................... | 350/150 |
| 3,499,112 | 3/1970 | Heilmeier et al. ............ | 350/160 LC |
| 3,499,702 | 3/1970 | Goldmacher et al. ........ | 350/150 |
| 3,503,673 | 3/1970 | Heilmeier et al. ............ | 350/160 LC |

OTHER REFERENCES
Holzman, IBM Technical Disclosure Bulletin, Vol. 8, No. 1 June 1965, pp. 151- 152

*Primary Examiner*—David Schonberg
*Assistant Examiner*—Ronald J. Stern
*Attorneys*—Hanifin and Jancin and George Baron ABSTRACT: An electro-optical display device employing a cell comprising a nematic liquid between two glass plates whose inner surfaces have been coated with transparent electrodes. Such coated electrodes are rubbed with a cloth or filter paper so that the liquid crystal film becomes oriented along the direction of rubbing. Such film will be homogeneous and strongly birefringent so that when an electric field is applied to the electrodes of the cell and the latter is viewed between crossed polarizers, a marked contrast in light between the quiescent and active states, respectively, of the cell is observed, even in the presence of ambient illumination of the cell.

PATENTED DEC 7 1971 3,625,591
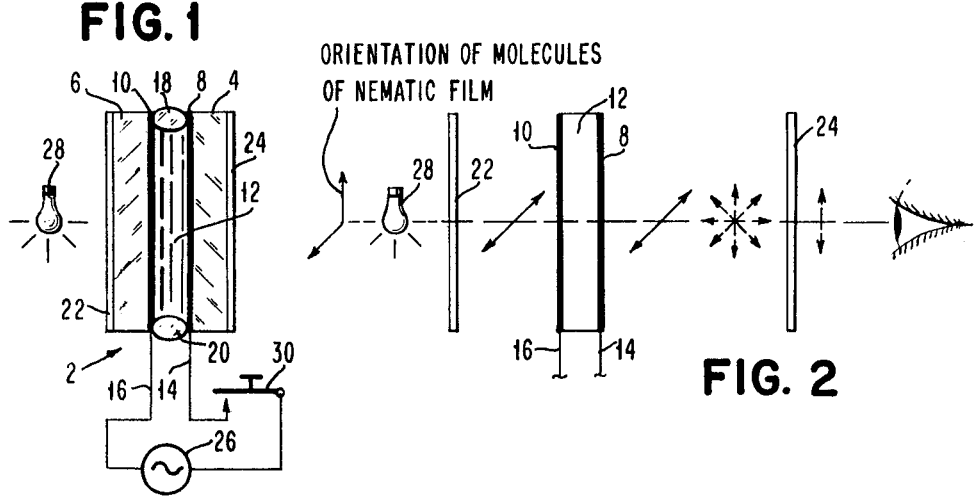
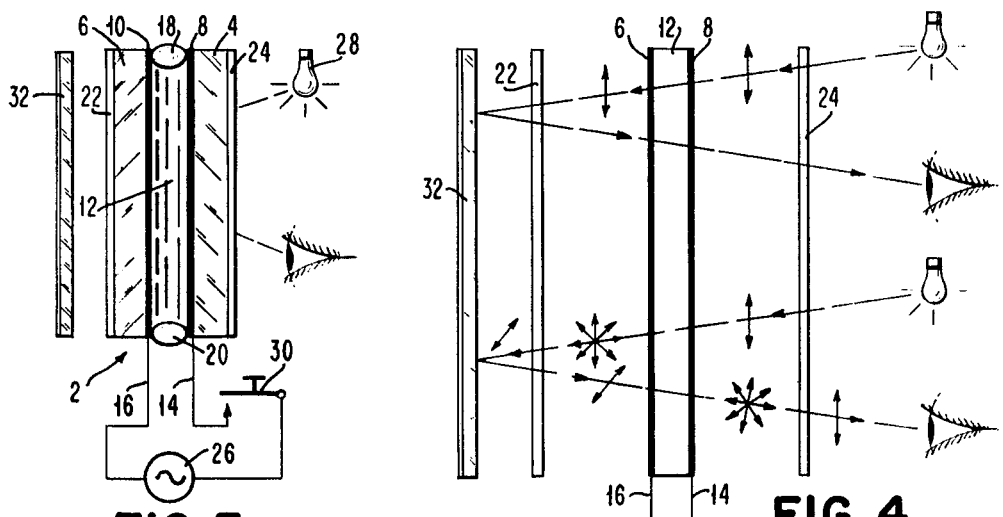
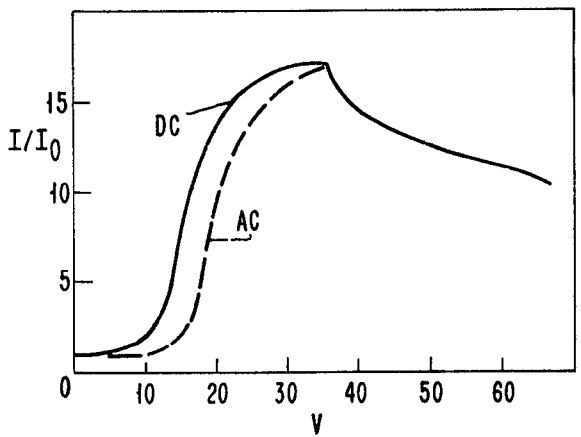
INVENTORS
MARVIN J. FREISER
IVAN HALLER
BY
ATTORNEY

LIQUID CRYSTAL DISPLAY ELEMENT

The employment of nematic liquids as an electrooptical element for modulating light or displaying light is set forth in U.S. Pat. No. 3,322,485 that issued to Richard V. Williams on May 30, 1967. Discussions of liquid crystals and their characteristics are found in the literature, i.e., *Transactions of the Faraday Society*, Vol. 29, Part 9, Sept. 1933, Pp. 881–1049, and any nematic liquid crystal is applicable to the invention to be described hereinafter. Acceptable liquid crystals are p-Azoxyanisole and p-methoxybenzylidene-p-n-butylaniline (identified as MBBA), with the latter being highly desirable because it is a room temperature nematic.

In the above noted Williams's Pat. No. 3,322,485, an observer views his nematic cell at an angle that is substantially perpendicular to the cell. Incident ambient light is directed at an angle to the cell. In this quiescent state, the substantially oriented nematic fluid in the cell reflects almost all the incident light away from the viewer. When an electric field is applied to transparent electrodes of the cell, the nematic fluid becomes disoriented, scattering the incident ambient light towards the eye of the viewer. Contrast between the active state and quiescent state of the cell is achieved as a result of such light scattering. The inventor of Pat. No. 3,222,485 theorizes that the light scattering effect is achieved because groups of parallel-oriented molecules of the nematic compound exist wherein all molecules in each group tend to move in the same direction at the same time. Such groups or swarms of molecules are regarded as domains. These domains tend to change their direction when the electrical field across the nematic compound reaches a certain threshold valve. The change in the direction of groups or swarms of the molecules is thought to result in the scattering of light by domain walls.

It has been found that the display cells that rely upon the light-scattering effect of a disoriented nematic fluid as a means of obtaining contrast between its active and quiescent state does not attain a high contrast and ratios of 7 to 1 between the active and quiescent states are considered high in practice.

The present invention achieves much higher contrast in light intensity between the quiescent and active states of a nematic cell by relaying upon two features, namely, (1) a preorientation of the nematic fluid on the walls of the cell and (2) the use of polarizers for observing the difference in light intensity between such two states. The employment of such two features has resulted in contrast ratios of 20 to 1, and in certain cases, ratios of 100 to 1 or higher can be attained.

It is a primary object of this invention to attain an improved electro-optical element useful in light modulators, optical storage or displays and the like using a nematic compound.

FIG. 1 is a schematic showing of the improved nematic cell and FIG. 2 is diagram illustrating changes in polarization of light passing through the cell for the two states of the cell.

FIG. 3 is a modification of the cell of FIG. 1 and FIG. 4 is an illustration of changes in polarization of light for the two states of the cell of FIG. 3.

FIG. 5 is a plot of transmitted light through the cell of FIG. 1 for changes in voltage applied to the electrodes of such cell.

The electro-optical device 2 of FIG. 1 comprises two transparent substrates 4 and 6, such as glass or other inert material having good light transmissive characteristics. The substrates 4 and 6 have plane opposed parallel faces on which are deposited electrically conductive light-transparent electrodes 8 and 10, of the order of 1000–3000 A. in thickness. There are many materials that can be employed for making such electrodes, and tin oxide is one of many acceptable material well known in the art. Prior to inserting a suitable nematic liquid 12 between electrodes 8 and 10, the latter are rubbed with cloth or leather in the same direction so that the two electrode surfaces permit all the molecules of any liquid crystal inserted therebetween to assume a uniform orientation.

The spacing between electroded glass plates 4 and 6 is between 5 to 300 microns, and the spacing may be maintained by shims, raised bevels on the opposed parallel plates 4 and 6, or by any other suitable means. Although capillary action will be sufficient to maintain the liquid crystal 12 in the thin space between the electrodes 8 and 10, after electrical leads 14 and 16 are connected to such electrodes 8 and 10, respectively, molten glass beads 18 and 20 can be dropped over the spacings to prevent loss of the fluid. Secured to the outer surfaces of each glass plate 6 and 4 are crossed polarizers 22 and 24. A low-frequency (up to several kilocycles) AC source 26 is connected to lead 14 and 16.

With the aid of FIG. 2, operation of FIG. 1 will be described. Assume that a diffused light source 28 is observed through cell 2 at a location in front of the cell 2 as shown in the drawing. Such diffused light 28, when passing through polarizer 22, will become polarized in a direction parallel to the plane of the drawing. Upon passing through the nematic liquid 12 in its quiescent state (switch 30 is open and no voltage is across electrodes 8 and 10), the light remains polarized in the plane of the paper. However, since polarizer or analyzer 24 is crossed with polarizer 22, such polarized light does not pass through analyzer 24 and the observer sees a dark background despite the presence of ambient light in the neighborhood of the cell 2.

When switch 30 is closed so that the low-voltage AC source is applied across electrode 8 and 10, the liquid crystal 12 conducts current and such conduction produces a chaotic redistribution of the molecules of the liquid crystal film. Such redistribution of the molecules of the liquid crystal serves to depolarize the light (see dotted portions of FIG. 1), and analyzer 24 passes only that light which is polarized perpendicular to the plane of the drawing, which light is seen by the eye of the observer.

The embodiment of FIG. 3 is similar to the cell of FIG. 1 save that the polarized light that traverses the cell 2, impinges on a mirror 32, and then returns through the cell back to the eye of the observer. As seen in FIG. 4, the diffused light source 28 enters the cell 2 from the same side as the observer. Such diffused light, on passing through analyzer 24, becomes polarized perpendicular to the plane of the drawing. With switch 30 opened, such polarized light traverses cell 2 unchanged, but is unable to pass through polarizer 22 that is crossed with polarizer 24. As a result, no light is reflected from mirror 32, so that the observer sees cell 2 as an opaque background. When switch 30 is closed so as to activate cell 2 (see bottom portion of FIG. 4) diffused light source 28 becomes polarized perpendicularly to the plane of the drawing as it passes through polarizer 24, but is depolarized after passing through the now activated cell 2. Such depolarized light, upon passing through polarizer 22, becomes polarized in the plane of the drawing and remains so polarized after reflection from mirror 32 and passage again through polarizer 22. The polarized light is again depolarized upon its passage through active cell 2 and becomes depolarized again, exiting from analyzer 24 as light that is polarized at right angles to the plane of the paper and observable by the viewer.

It is understood that many liquid crystals can be used in the present device and where a substance has nematic properties only at elevated temperatures, then the cell 2 is maintained at such elevated temperatures. Acceptable nematic liquids are anisylidene para-aminophenyl-acetate (APAPA), p-azoxyanisole, and p-methooxy-benzylidene-p-n-butylaniline (MBBA), the latter being particularly desirable in that it is a room temperature nematic.

FIG. 5 is a plot of transmission of light through the cell 2 as a function of applied voltage, when cell contained APAPA. APAPA has nematic properties between 85°–90° C. so that the cell was maintained at this temperature while both AC and DC voltages were applied to the cell. The solid line shows a threshold of about 10 volts for DC operation and the dotted line shows a threshold of about 15–16 volts, with the intensity of light transmitted being given in arbitrary units. In general, the AC curve is similar to the DC curve at low frequencies, but at higher frequencies, the AC curve shifts to the right of the DC curve.

Tests on the cell 2 were made using DC voltages between 0 and 60 volts and AC voltages between 0 and 80 volts. Conductive coatings of time oxide are of the order of 1000–2000 A. Prior to applying the nematic fluid to such glass supported conductive coatings, a piece of cheese cloth was spread onto a flat surface and each conductive coated glass was rubbed across the fixed cheese cloth about 25–30 times so that the molecules of the liquid crystal, when spread across the conductive coatings prior to clamping or securing the coated surfaces in facing relationship, would all be aligned in a direction parallel to such coatings.

It has been observed that the combination of aligning the molecules of a liquid crystal in the nematic cell in combination with the use of crossed polarizers on the outer surfaces of the glass supports results in contrasts of at least 20 to 1 between light seen when the cell 2 is active and when the cell 2 is quiescent. Additionally, the cell 2, even in ambient light, is opaque when viewed by transmitted light or by reflected light. It is to be understood that multiple cells 2 can be employed in a matrix, utilizing grids to actuate selected cells in the matrix, the provide an optical display device. Such matrix can also be used as as substitutes for presently used light valves, optical switches, optical modulators, etc.

What is claimed is:

1. An electro-optical display device comprising two parallel transparent members spaced apart a distance of 10–500 microns,
    transparent electrodes on the facing surfaces of said members,
    a nematic liquid interposed and filling the space between said electrodes and having all its molecules in their quiescent state, nonelectrically aligned parallel to such facing surfaces along a given direction in said surfaces, due to said electrodes having rubbed in said given direction, said liquid having a threshold electric field which, when exceeded, causes said liquid to depolarize polarized light passing therethrough,
    two crossed polarizers located adjacent said transparent members, each polarizer located on the outer surface of its respective transparent member and having a direction of polarization respectively perpendicular and parallel to said given direction, and
    means for selectively applying an electric field across said liquid through said electrodes that exceeds said threshold electric field, where by said nematic liquid is switched from its quiescent state to polarize light passing therethrough.

2. An electro-optical display device comprising two parallel transparent members spaced apart between 10–500 microns,
    transparent electrodes on the facing surfaces of said members,
    a nematic liquid interposed and filling the space between said electrodes and having all its molecules in their quiescent state, nonelectrically aligned parallel to such facing surfaces along a given direction in said surfaces, due to said electrodes having rubbed in said given direction, said liquid having a threshold electric field which, when exceeded, causes said liquid to depolarize polarized light passing therethrough,
    two crossed polarizers located adjacent said transparent members, each polarizer located on outer surface of its respective transparent member and having a direction of polarization respectively perpendicular and parallel to said given direction,
    a mirror adjacent one of said polarizers, and
    means for selectively applying an electric field across said liquid through said electrodes that exceeds said threshold electric field, where by said nematic liquid is switched from its quiescent state to polarize light passing therethrough.

3. The electro-optical device of claim 1 wherein said nematic liquid is p-methoxybenzylidene-p-n-butylaniline.

4. The electro-optical device of claim 2 wherein said nematic liquid is p-methoxybenzylidene-p-n-butylaniline.

* * * * *